United States Patent [19]
Louwagie et al.

[11] Patent Number: 5,348,491
[45] Date of Patent: Sep. 20, 1994

[54] JACK MODULE

[75] Inventors: Dominic J. Louwagie, Eden Prairie; John M. Field, Edina, both of Minn.

[73] Assignee: ADC Telecommunications, Inc., Minneapolis, Minn.

[21] Appl. No.: 141,218

[22] Filed: Oct. 29, 1993

[51] Int. Cl.⁵ ............................................. H01P 1/10
[52] U.S. Cl. ................................. 439/188; 439/579; 333/124; 333/127; 200/51.09
[58] Field of Search ................. 439/188, 579, 578; 333/124, 127, 22 R; 200/51.09, 51.1, 51.11

[56] References Cited

U.S. PATENT DOCUMENTS

| | | | |
|---|---|---|---|
| 3,109,997 | 11/1963 | Giger et al. | 439/585 |
| 3,360,747 | 12/1967 | Lancaster | 333/105 |
| 3,372,349 | 3/1968 | Concelman | 333/105 |
| 3,529,264 | 9/1970 | Lancaster | 333/101 |
| 4,749,968 | 6/1988 | Burroughs | 333/105 |
| 4,815,104 | 7/1991 | Williams et al. | 375/36 |
| 5,147,992 | 9/1992 | Eriksen et al. | 439/188 |
| 5,246,378 | 9/1993 | Seiceanu | 439/188 |
| 5,280,254 | 1/1994 | Hunter et al. | 439/188 |

FOREIGN PATENT DOCUMENTS 658424  2/1963  Canada .

OTHER PUBLICATIONS

Cover page and p. 25 of Trompeter Electronics catalog T-16 showing product J18T.

Cover page and p. 25 and last page (showing what is believed to be a printing date of 1989) of Trompeter Electronics Catalog T-17 showing product J18T.

Cover page and pp. 26, 31, 32 and 33 of Trompeter Electronics Catalog T18A showing products J18, J74, J74T-R, J74MST-R, J74-2T-R.

Primary Examiner—Gary F. Paumen
Attorney, Agent, or Firm—Merchant, Gould, Smith, Edell, Welter & Schmidt

[57] ABSTRACT

A jack module including a switching jack subassembly and monitor jack assembly includes a printed circuit board between the subassemblies. The subassemblies and circuit board are commonly housed. The printed circuit board contains monitor circuitry.

7 Claims, 17 Drawing Sheets

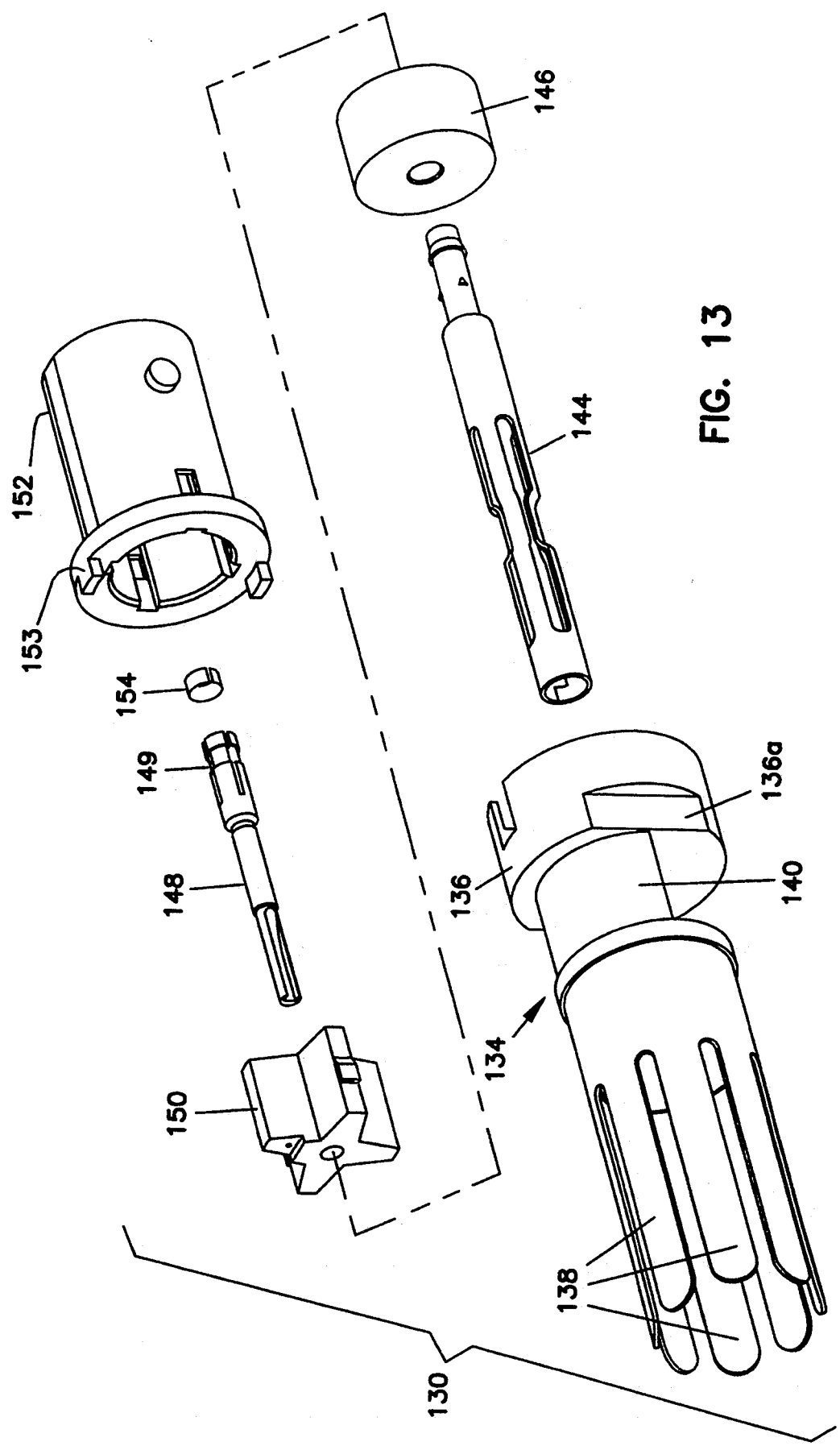

JACK MODULE

BACKGROUND OF THE INVENTION

1. Field of the Invention

This invention pertains to coaxial cable jacks and more particularly to a coaxial cable jack module with construction to provide enhanced circuit performance.

2. Prior Art

In the prior art, jack modules for coaxial cable connections are well known. An example of such is shown in commonly assigned U.S. Pat. No. 4,749,968 to Burroughs.

The Burroughs patent shows a jack module 20 which includes a configuration (utilizing the embodiment of FIG. 8 of the patent) having two parallel spaced apart central conductors connected by a switch mechanism. The switch mechanism electrically connects the two parallel spaced apart central conductors when a plug is absent from ports associated with the central conductors. Upon insertion of a plug into either of the ports associated with the two central conductors, the switch isolates the other central conductor to ground.

As shown in the Burroughs patent, jacks of the type shown therein may be associated with single central conductor jacks for monitoring purposes. When a single jack is used in a monitoring configuration, the single jack is connected across either a resistance or inductance circuit to one of the central conductors which are joined by the switching mechanism. Insertion of a plug into the monitor jack permits monitoring of a signal flowing through the two parallel central conductors without disruption of the signal.

In the prior art, jack modules having a monitor central conductor joined in a common housing with two central conductors joined by a switch are known. An example of such is shown in U.S. Pat. No. 5,246,378, issued Sep. 21, 1993. Also, an example of such is Product No. J18-75T as sold by Trompeter Electronics, Inc.

In designing jack modules, it is desirable to develop a design which permits low cost manufacture. Further, the design should have enhanced performance. In an ideal world, the jack module, upon installation, is transparent to the telecommunications network of which it is a part. This requires low insertion losses even for high bit rate signals. Also, it is desirable to provide a jack module having enhanced flexibility for alternative uses including connections to fiber, twisted pair or other connections. It is an object of the present invention to provide such an enhanced jack module.

SUMMARY OF THE INVENTION

According to a preferred embodiment of the present invention, a jack module is provided which includes a first jack subassembly and a second jack subassembly. The first jack subassembly includes first and second center conductors and a support mechanism for supporting the first and second center conductors in parallel alignment. A jack switch is provided between the first and second central conductors. The jack switch normally electrically connects the first and second central conductors in the absence of a plug associated with either of the first or second central conductors. Upon connection of a plug with one of the first or second central conductors, the jack switch grounds the other central conductor. The second jack subassembly includes a third central conductor. The jack module further includes a shell for holding the first and second jack assemblies in desired alignment with a spacing between the assemblies sized to receive a printed circuit board including a monitoring network.

BRIEF DESCRIPTION OF THE DRAWINGS

FIG. 13 is an exploded perspective view of a second jack assembly for use in the present invention;

DESCRIPTION OF THE PREFERRED EMBODIMENT

Figure 1:
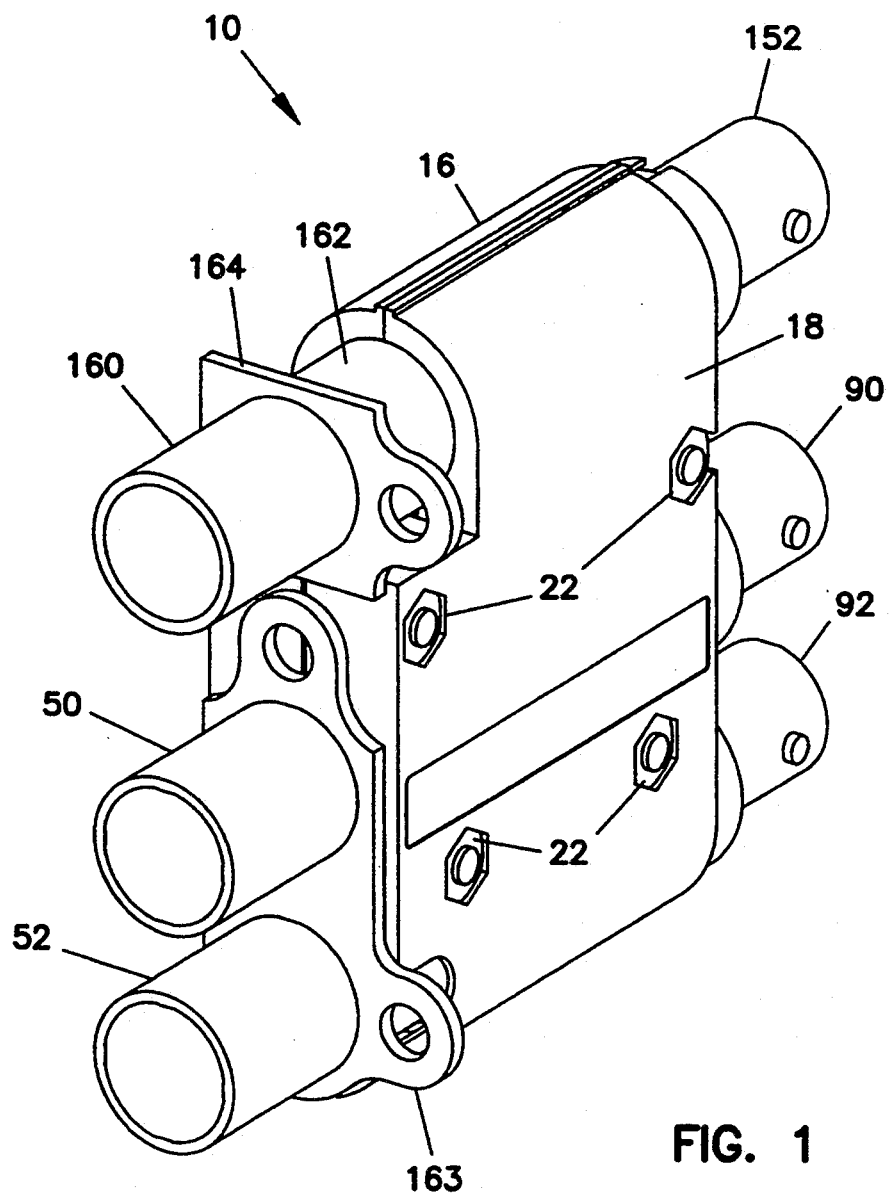
FIG. 1 is a perspective view of a jack module according to the present invention.
Figure 3:
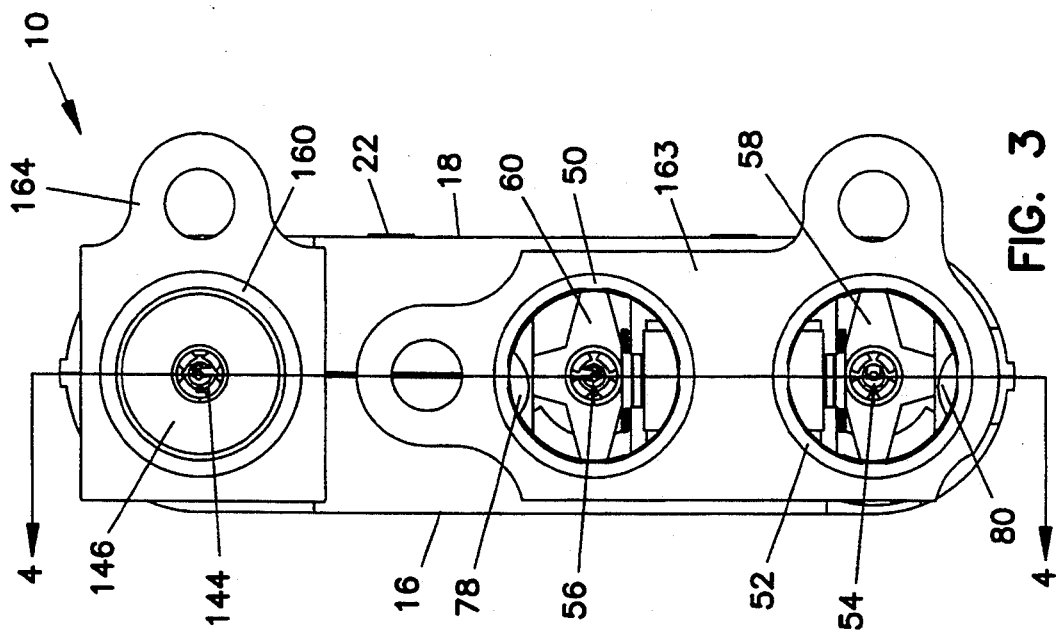
FIG. 3 is a front elevation view of the jack module of FIG. 1.
Figure 2:
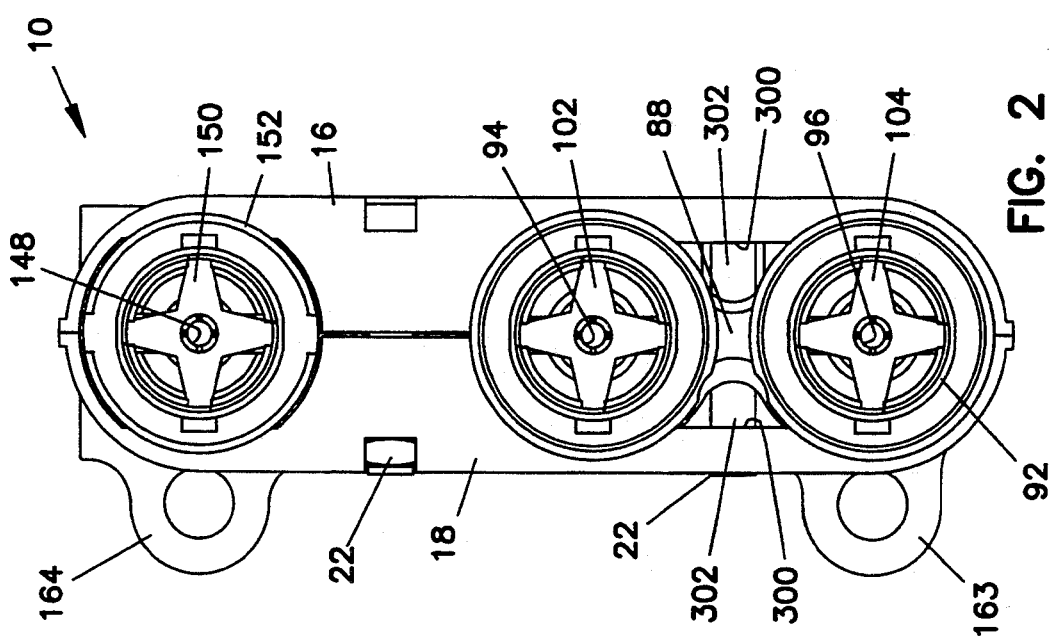
FIG. 2 is a rear elevation view of the jack module of FIG. 1.

Referring now to the several drawing figures in which identical elements are numbered identically throughout, a description of the preferred embodiment of the present invention will now be provided.

With initial reference to FIGS. 1 through 4 and 4A, the jack module 10 is shown. The jack module 10 includes a first jack subassembly 12 and a second jack subassembly 14 commonly joined in the jack module 10 by means of a first shell half 16 and a second shell half 18. The shell halves 16,18 also house a printed circuit board 20 as will be more fully described. The shell halves 16,18 are joined together by nut and bolt fasteners 22.

Figure 4:
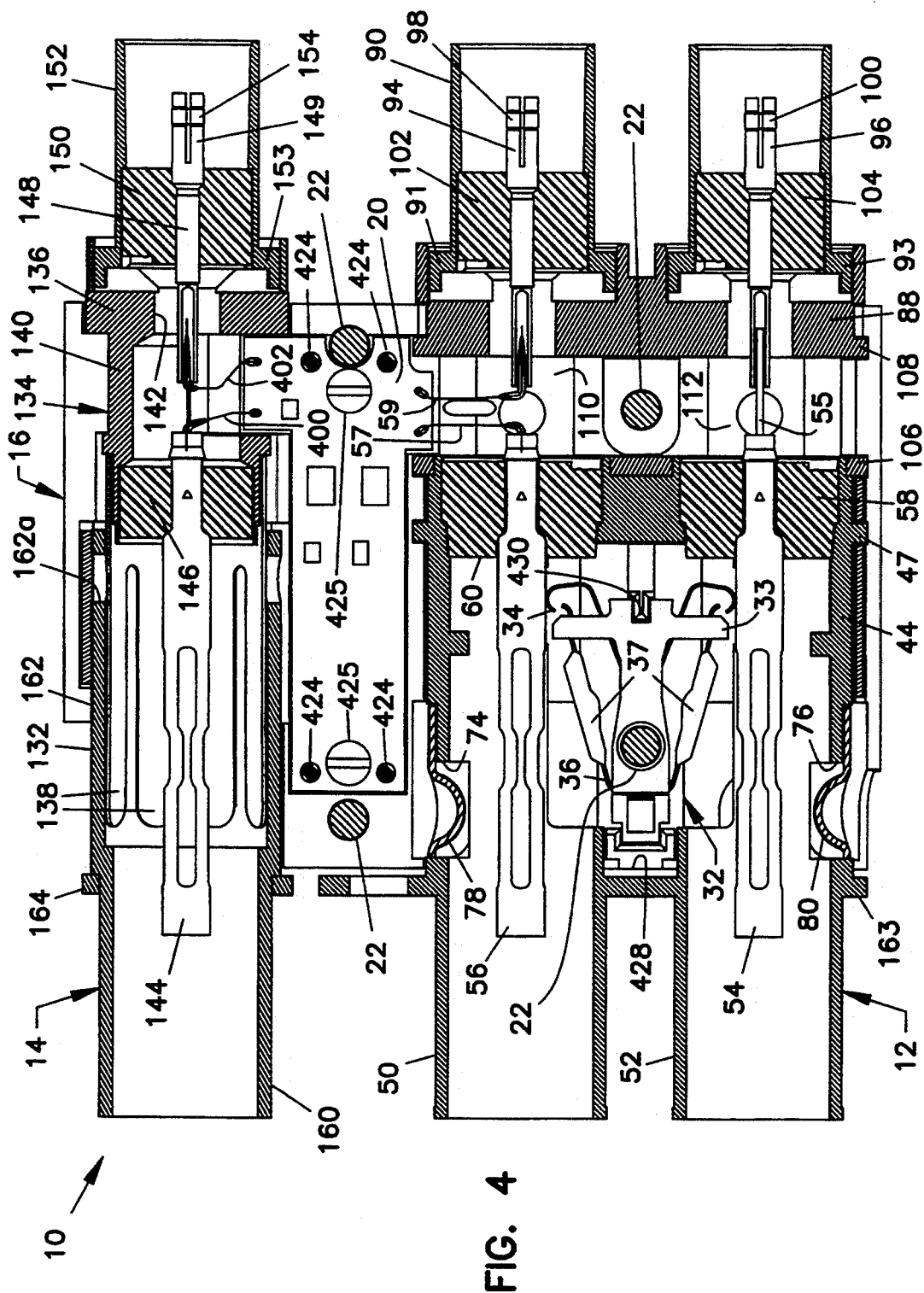
FIG. 4 is a view taken along line 4—4 of FIG. 3.
Figure 4A:
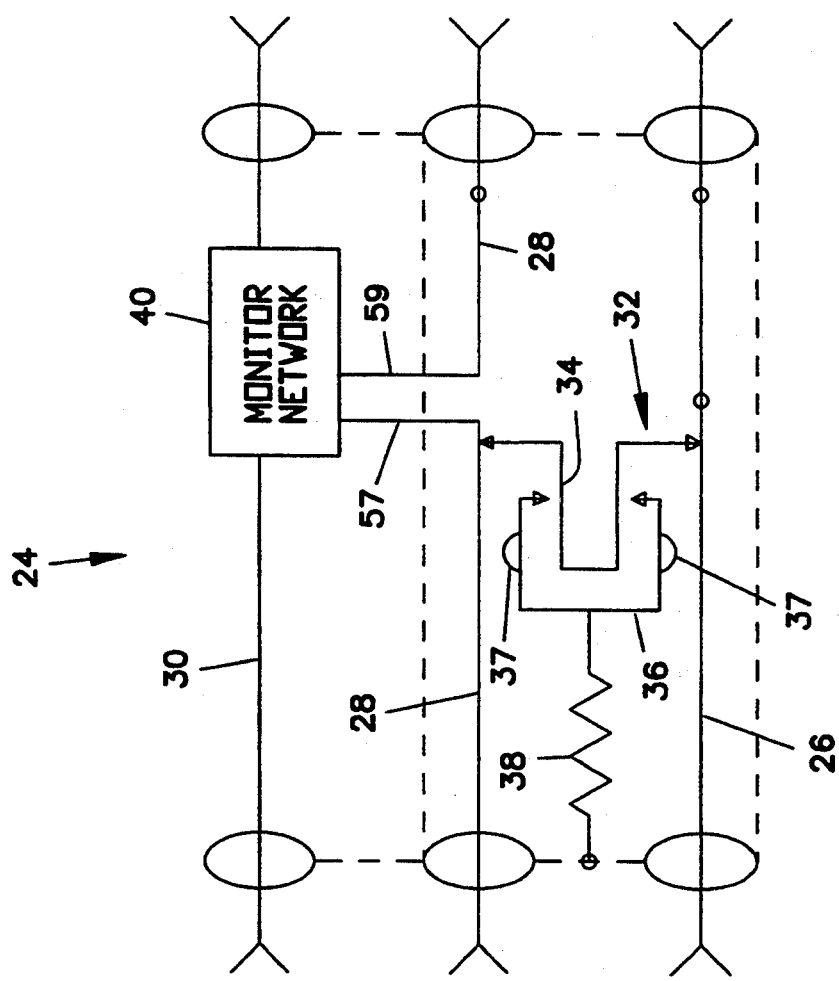
FIG. 4A is a schematic representation of the circuit of the module of FIG. 4.

As will become more fully apparent, the jack module 10 has the circuitry 24 shown in FIG. 4A. Schematically shown in FIG. 4A, the circuitry 24 includes a first (or IN) central conductor 26, a second (or more commonly referred to as OUT) central conductor 28 and a third (or more commonly referred to as a monitor or MON) central conductor 30.

The circuitry 24 further includes a switch mechanism 32 including a normal spring 34 electrically connecting conductors 26,28. A ground spring 36 is positioned to urge spring 34 away from conductor 28 upon connection of a jack plug to conductor 28. Similarly, ground spring 36 is disposed to urge normal spring 34 away from central conductor 26 upon connection of a jack plug to central conductor 26.

The ground spring 36 is connected to an electrical ground across a resistor 38. Commonly, resistor 38 is 75 ohms to be compatible with North American telecommunication network standards.

The circuitry further includes a monitor network 40 electrically connected to both the out central conductor 28 and the monitor central conductor 30. The monitor network 40 permits a jack plug to be connected to monitor central conductor 30 to monitor the signal flowing in central conductor 28 without interruption of the signal flowing in central conductor 28. The monitor network may either be a resistance-based monitor network or an inductance-based monitor network as are known to those skilled in the art. For use in a high bit rate application, an inductance monitor network 40 is preferred since it results in a lower power loss through the network 40.

First jack subassembly 12 and the switch mechanism 32 are very similar to the structure shown in commonly assigned U.S. Pat. No. 4,749,968 to Burroughs the teachings of which are incorporated herein by reference. The first jack subassembly 12 is best described with reference to FIGS. 5 through 8.

Figure 5:
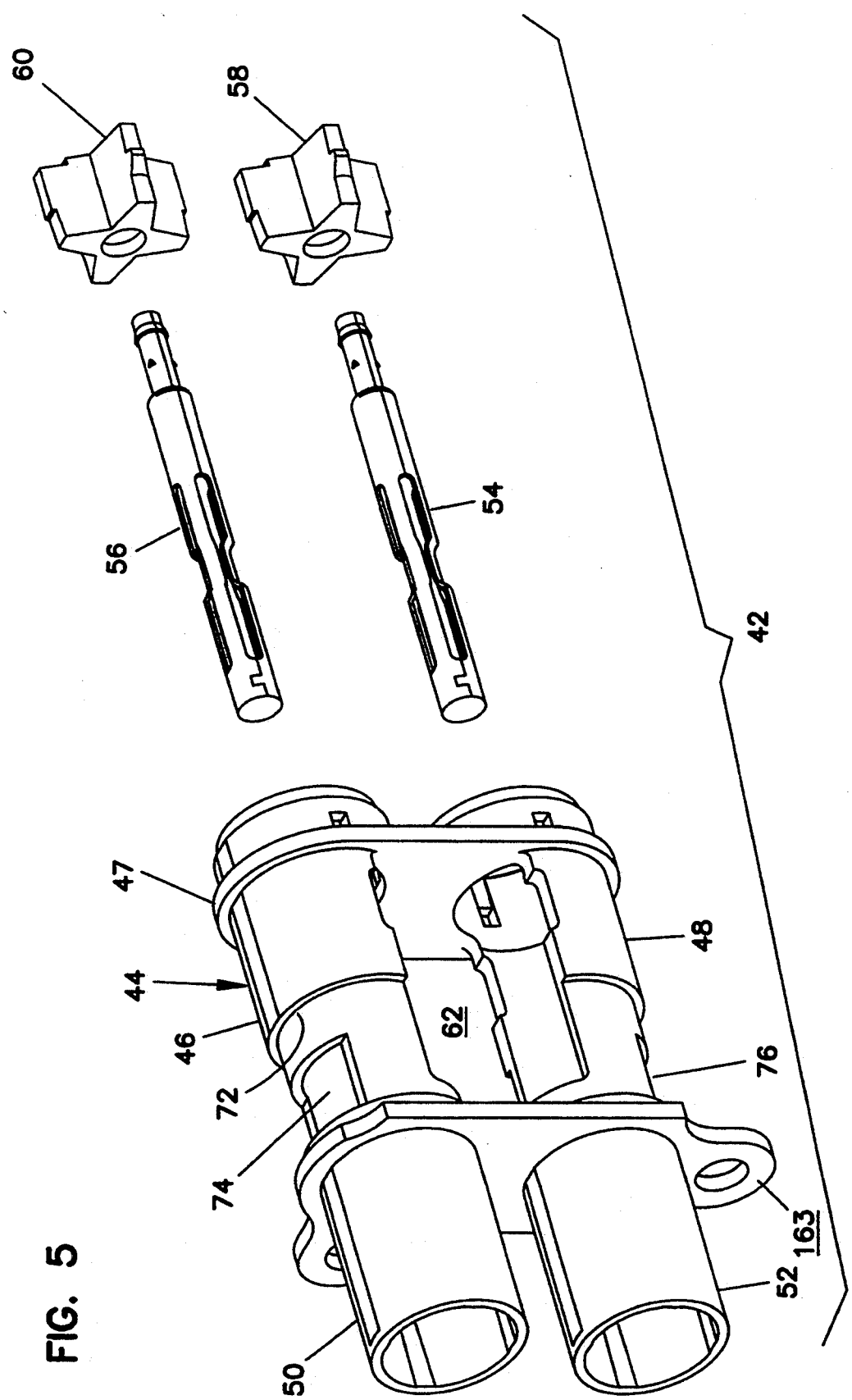
FIG. 5 is an exploded perspective view of a front portion of a first jack subassembly for use in the jack module of FIG. 1.
Figure 6:
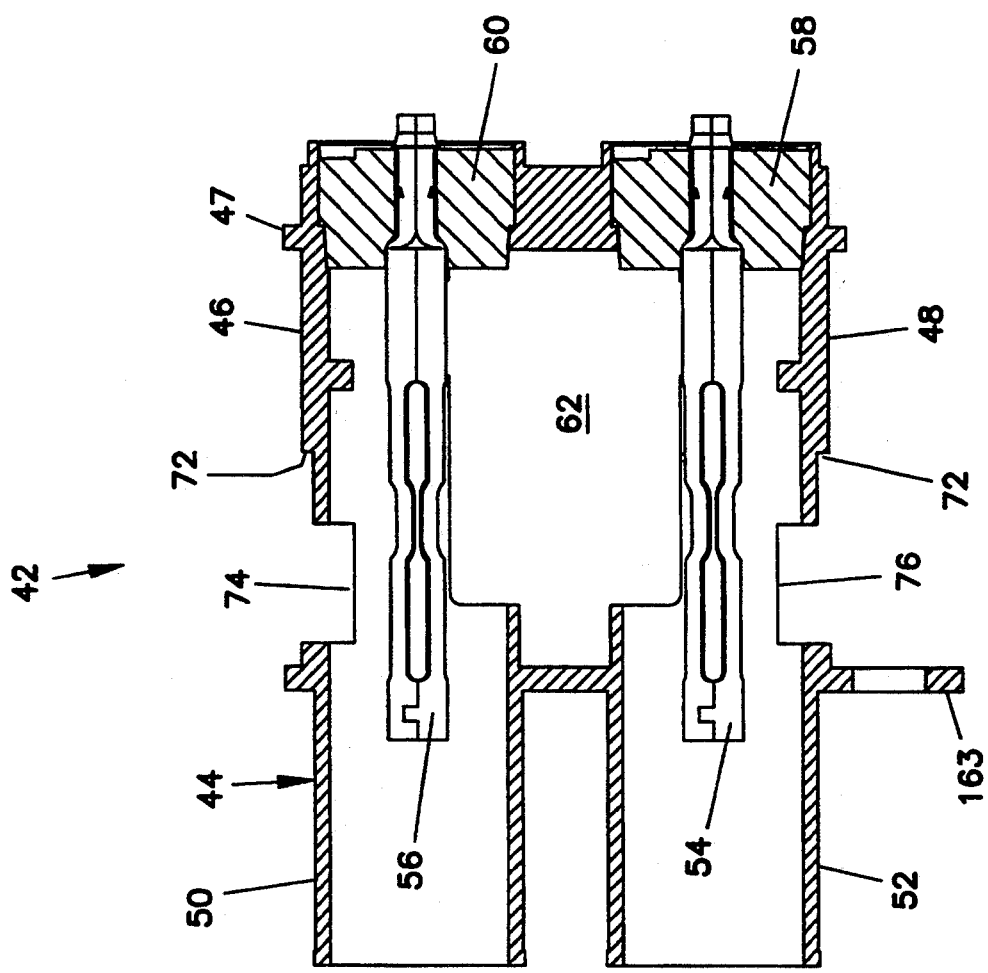
FIG. 6 is a cross-section, assembled view of the front portion of FIG. 5.

Unless otherwise indicated, all elements of subassembly 12 (as well as all other elements of module 10) are metallic and electrically conductive. FIGS. 5 and 6 show the front half 42 of the first jack subassembly 12. The front half 42 includes a front casting 44 having two generally semicylindrical shells 46,48 which are a parallel aligned to one another and each associated with a cylindrical jack port 50,52. First and second front center conductors 54,56 are mounted within the front casting 44 and supported by dielectric insulators 58,60.

Shown best in FIG. 6, first front center conductor 54 is supported in insulator 58 to be coaxially aligned with the axes of cylinder 52 and semicylinder 48. Similarly, second front center conductor 56 is supported by insulator 60 to be coaxially aligned with cylinder 50 and semicylinder 46. In the assembled front half 42 as shown in FIG. 6, the semicylindrical portions 46,48 are aligned for their interior surface to oppose one another and provide a unobstructed space 62 between the front center conductors 54,56. The space 62 is sized to receive the switch mechanism 32.

Figure 10:
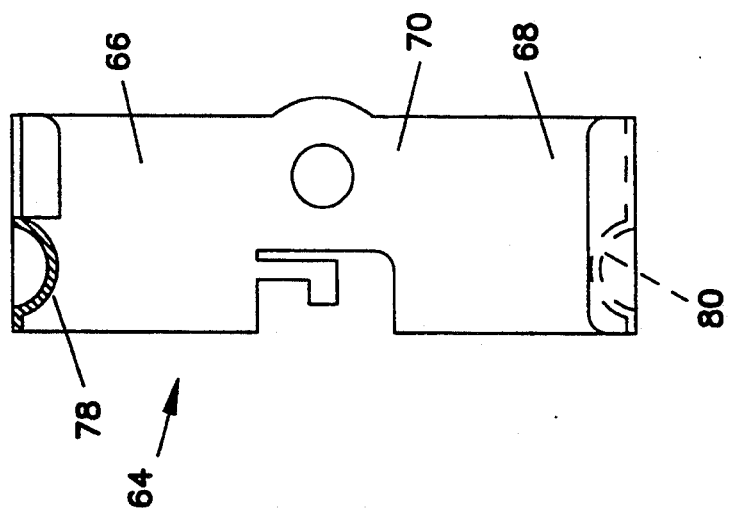
FIG. 10 is a top elevation view of the ground clip of FIG. 9.
Figure 9:
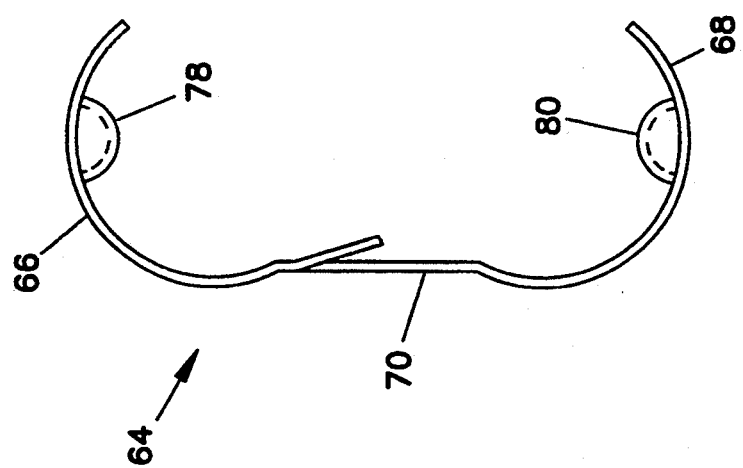
FIG. 9 is a side elevation view of a ground clip.
Figure 12:
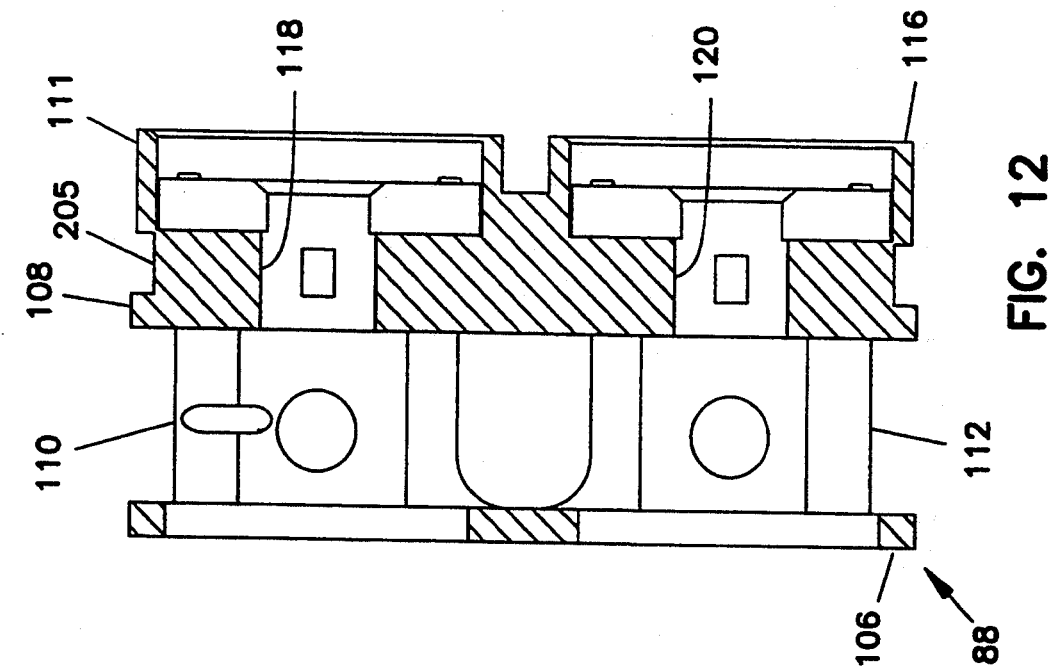
FIG. 12 is a side sectional view of the casting of FIG. 11.
Figure 11:
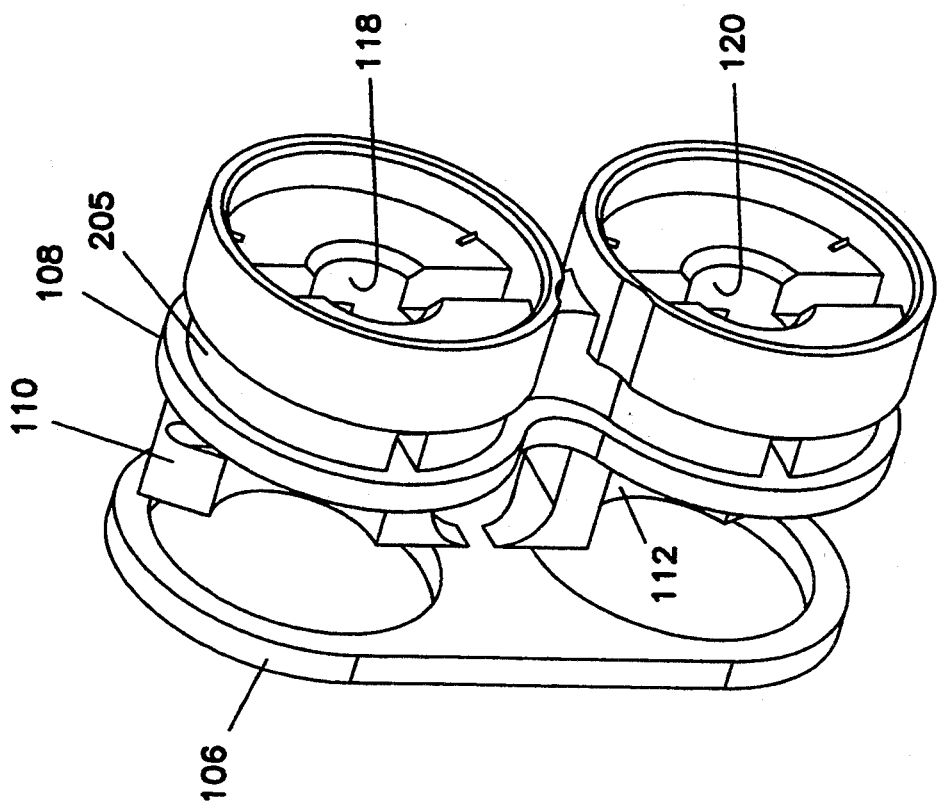
FIG. 11 is a perspective view of a rear casting for use in the rear portion of FIG. 8.

Not shown in the assembly of FIGS. 5 and 6, but shown separately in FIGS. 9 and 10, and assembled in the view of FIG. 4, is a ground clip 64 which includes two generally semi-cylindrical portions 66,68 joined by a flat body portion 70. The ground clip 64 is sized for the portions 66,68 to surround the semicylindrical portions 46,48 of front casting 44 with the ground clip 64 received within a recess 72 formed in the front casting 44.

The front casting 44 includes cutouts 74,76. Protrusions 78,80 are formed on semicylindrical portions 66,68 of ground clip 64. The protrusions 78,80 are positioned to be received within cutouts 74,76, respectively, as shown in FIG. 4.

With the front half 42 of the subassembly 12 being thus described, a jack plug of standard industry dimensions may be received within either of ports 50,52. Insertion of a jack plug (not shown) into port 50 results in the center pin of the jack plug being received within the front half center conductor 56 and electrically connected thereto. Further, the outer casing the jack plug urges against protrusion 78 to securely receive the jack plug within the port 50 as well as ground the outer casing of the jack plug. Similar connection to a jack plug is provided by insertion of a jack plug into port 52 with the center pin of the jack plug electrically connected to front half center conductor 54 and with the casing of the jack plug grounded to protrusion 80 of the ground clip 64.

Figure 7:
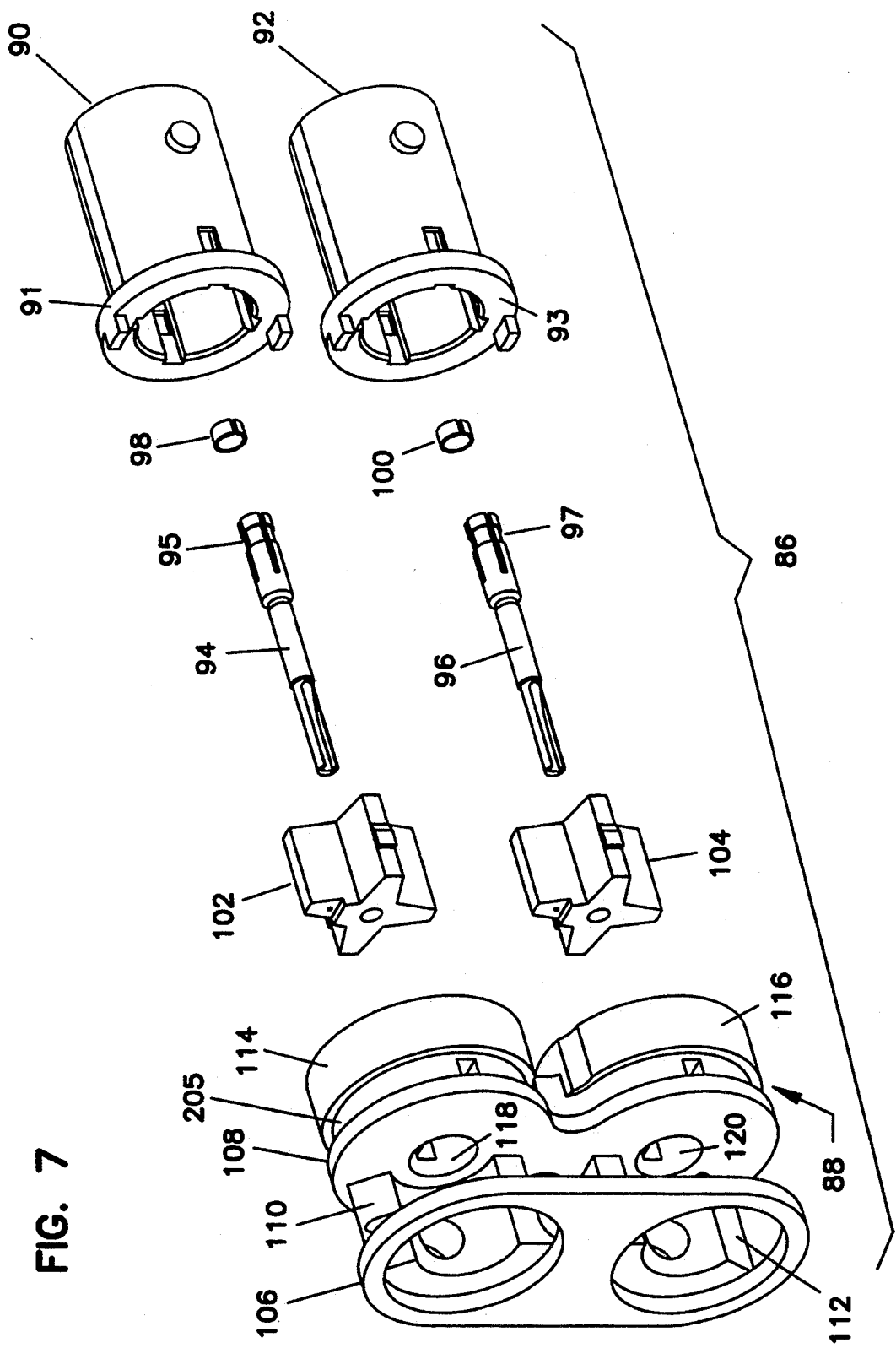
FIG. 7 is an exploded perspective view of a rear portion of the first jack assembly for use in the module of FIG. 1.
Figure 8:
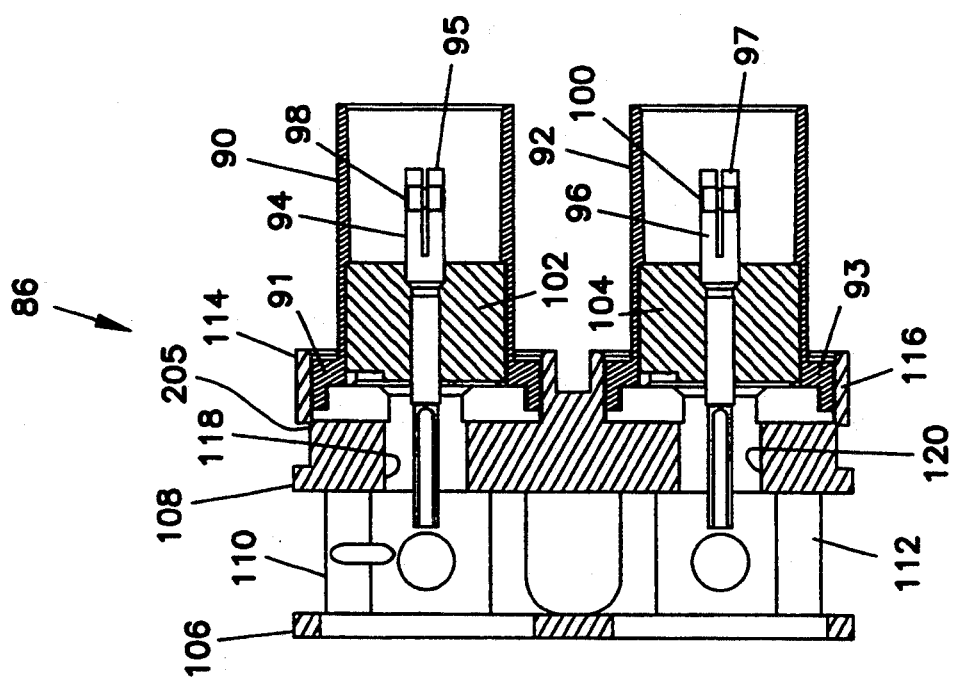
FIG. 8 is a cross sectional assembled view of the rear portion of FIG. 7.

The first jack subassembly 12 further includes a rear half 86 shown in FIGS. 7 and 8. The rear half 86 includes a rear casting 88, and first and second rear center conductors 94,96 having first and second retaining rings 98,100. Finally, the rear half 86 includes first and second insulating spacers 102,104 and first and second connectors 90,92.

Shown best in FIGS. 7, 8, 11 and 12, the rear casting 88 includes a front retaining flange 106 and an intermediate retaining flange 108 joined by semicylindrical supports 110,112. Extending from the rear of intermediate support flange 108 are first and second open cups 114,116 each sized to receive a flange 91,93 of rear connectors 90,92, respectively.

In FIG. 8, flanges 91,93 are shown received within cups 114,116. The connectors 90,92 (which are well-known BNC connectors) may be secured to the rear casting 88 by means of "coining" the cups 114,116 over the flanges 91,93. The phrase "coining" will be recognized by those skilled in the art as pertaining to rolling the edges of the cups 114,116 over the flanges 91,93 to mechanically secure the rear connectors 90,92 to the rear casting 88. Bores 118,120 are formed through the rear casting 88 with the bores 118,120 disposed to be coaxially aligned with the rear connectors 90,92. The rear center conductors 94,96 are retained within the bores 118,120 and spaced from the walls of the rear casting 88 by means of dielectric insulating spacers 102,104. The rear center conductors 94,96 pass through the spacers 102,104 with the spacers 102,104 retained within the rear connectors 90,92 forming the completed rear portion 86 of FIG. 8.

The rings 98,100 of FIG. 7 snap onto the pin-receiving ends 95,97 of the rear central conductors 94,96 to prevent extensive flaring of the ends 95,97 as center pins (not shown) of coaxial cables (not shown) are inserted into the ends 95,97.

The complete first subassembly 12 is shown in FIG. 4 with front half 42 and rear half 86 joined in proper alignment. A wire 55 connects front and rear conductors 54,96 for the conductors 54,96 and wire 55 to define the IN conductor 26 of FIG. 4A. Wires 57,59 connect the front and rear conductors 56,94, respectively, to the printed circuit board 20 with the conductors 56,94 and wires 57,59 and circuitry of the printed circuit board 20 defining the OUT conductor 28 of FIG. 4A which remains a closed circuit even if a plug is connected to the MON conductor 30.

Figure 17:
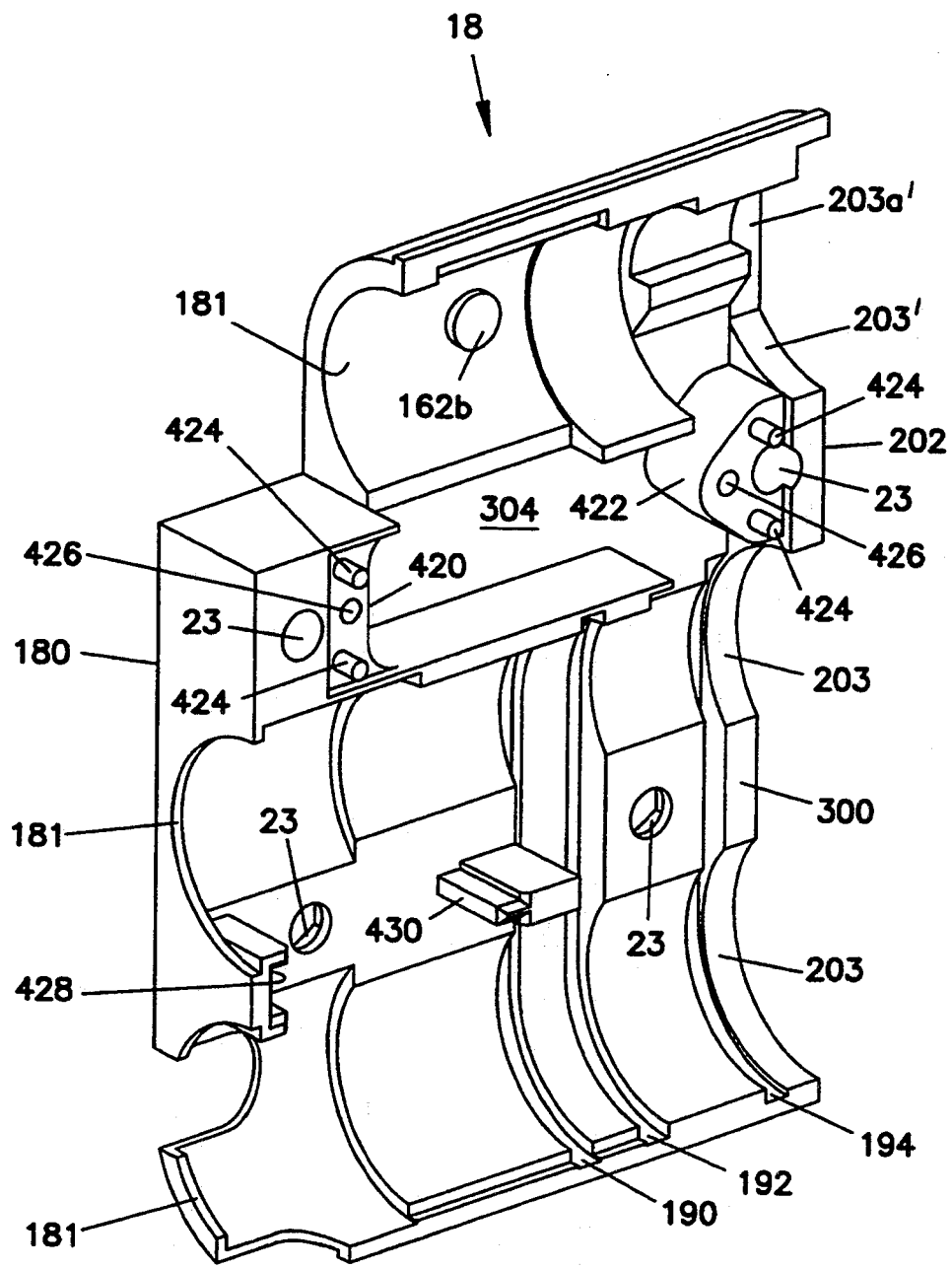
FIG. 17 is a perspective view showing an interior surface of a first half of a shell for use with the present invention.
Figure 20:
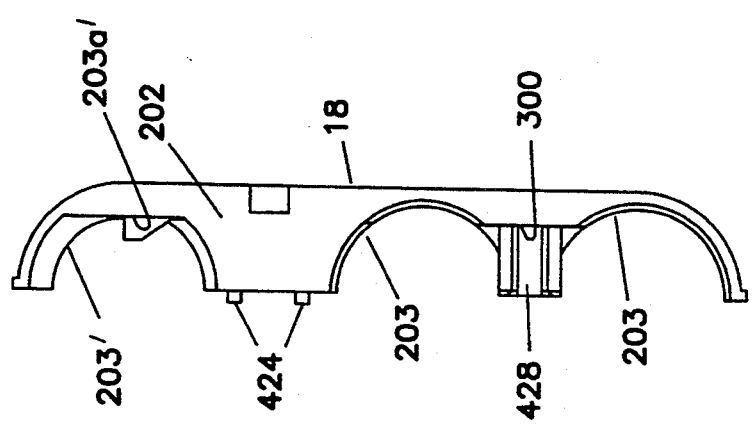
FIG. 20 is a rear elevation view of the shell of FIG. 17.
Figure 19:
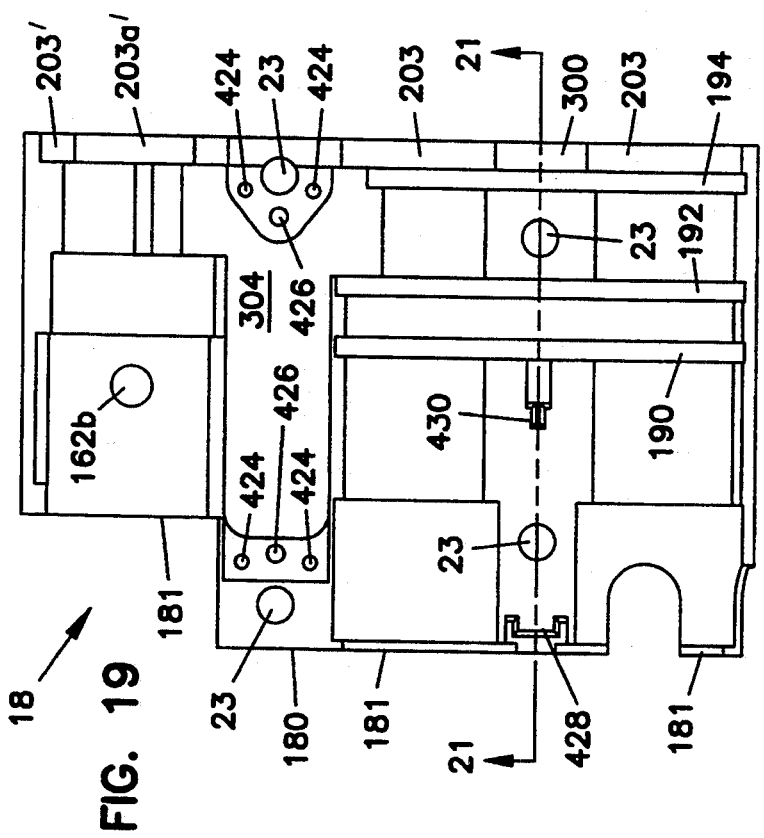
FIG. 19 is a side elevation view of the shell of FIG. 17 showing an interior surface thereof.
Figure 21:
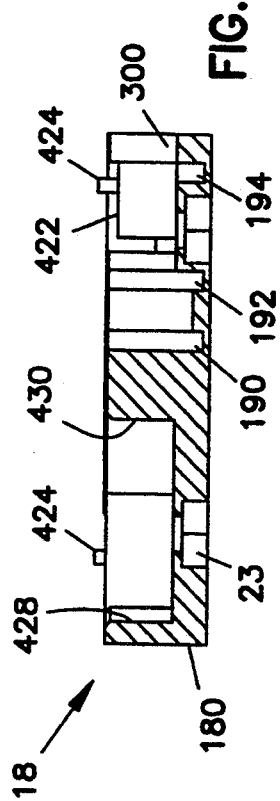
FIG. 21 is a view taken along line 21—21 of FIG. 19.
Figure 18:
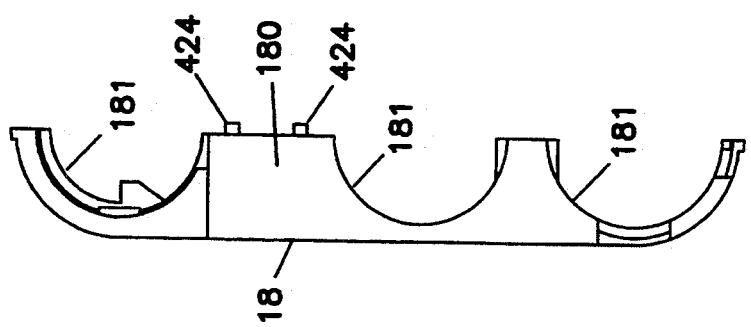
FIG. 18 is a front elevation view of the shell of FIG. 17.
Figure 22:
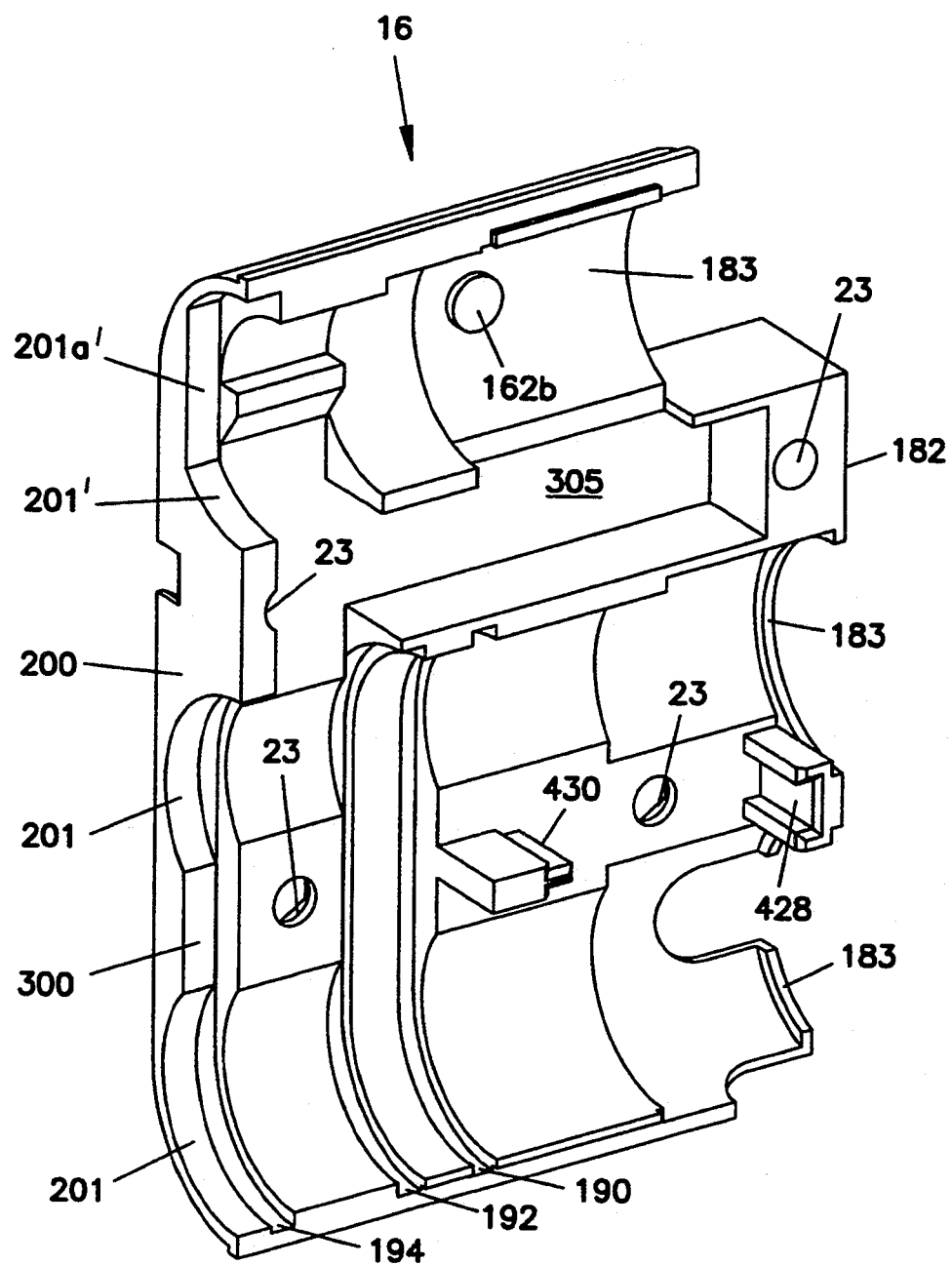
FIG. 22 is a perspective view showing an interior surface of a second shell half.
Figure 25:
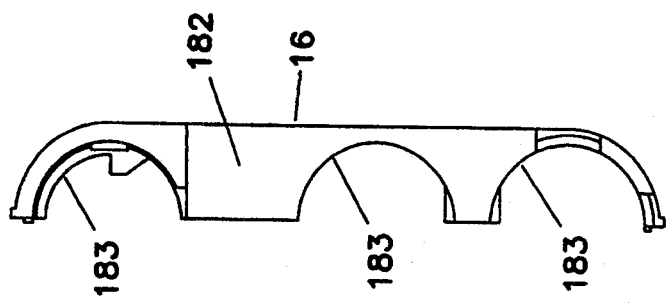
FIG. 25 is a front elevation view of the shell half of FIG. 22.
Figure 24:
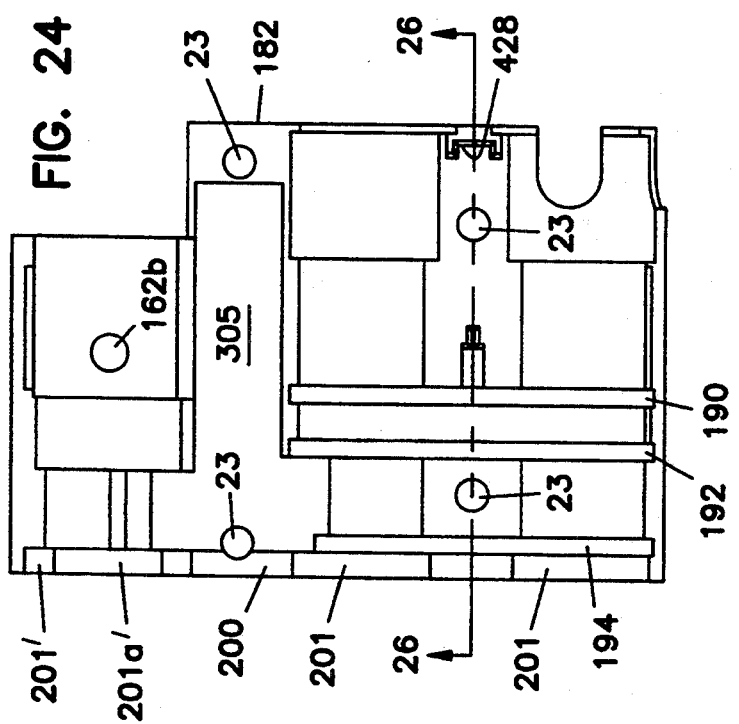
FIG. 24 is a side elevation view showing interior surfaces of the shell of FIG. 22.
Figure 26:
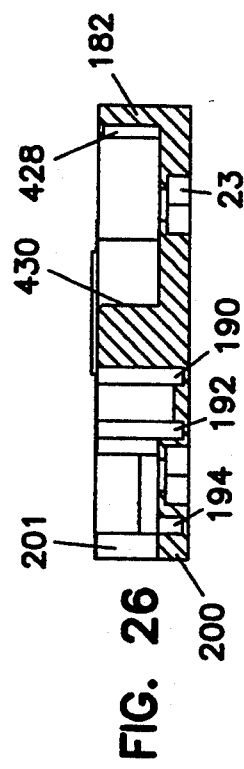
FIG. 26 is a view taken along line 26—26 of FIG. 24.
Figure 23:
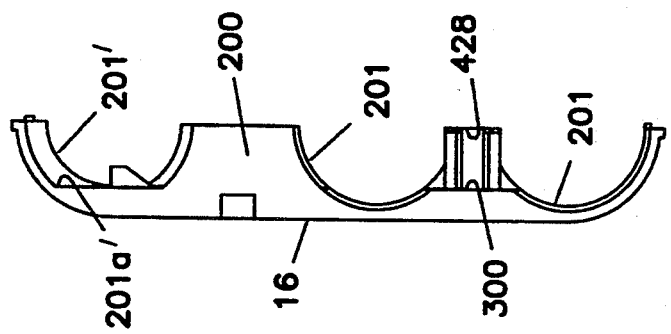
FIG. 23 is a rear elevation view of the shell half of FIG. 22.

The switch mechanism 32 is received within space 62 with normal spring 34 biased against both forward center conductors 54,56. The normal spring 34 and ground spring 36 are retained in a dielectric insulating housing 33 secured in place by a nut and bolt fastener 22. The shell halves 16,18 have grooves 428 and ribs 430 (see FIGS. 17,20) positioned to reside in area 62 when the first jack subassembly 12 is assembled between the halves 16,18. The grooves 428 and ribs 430 mate with the dielectric housing 33.

Dielectric cams 37 are provided on ground spring 36. Insertion of a plug into port 50 causes the plug to act against the cam 37 to thereby push ground spring 36 to push against normal spring 34 and urge the normal spring away from front center conductor 56 and causing conductor 54 to be connected across a resistance to grounds. Insertion of a plug into port 52 results in a similar operation with conductor 56 becoming grounded.

Figure 14:
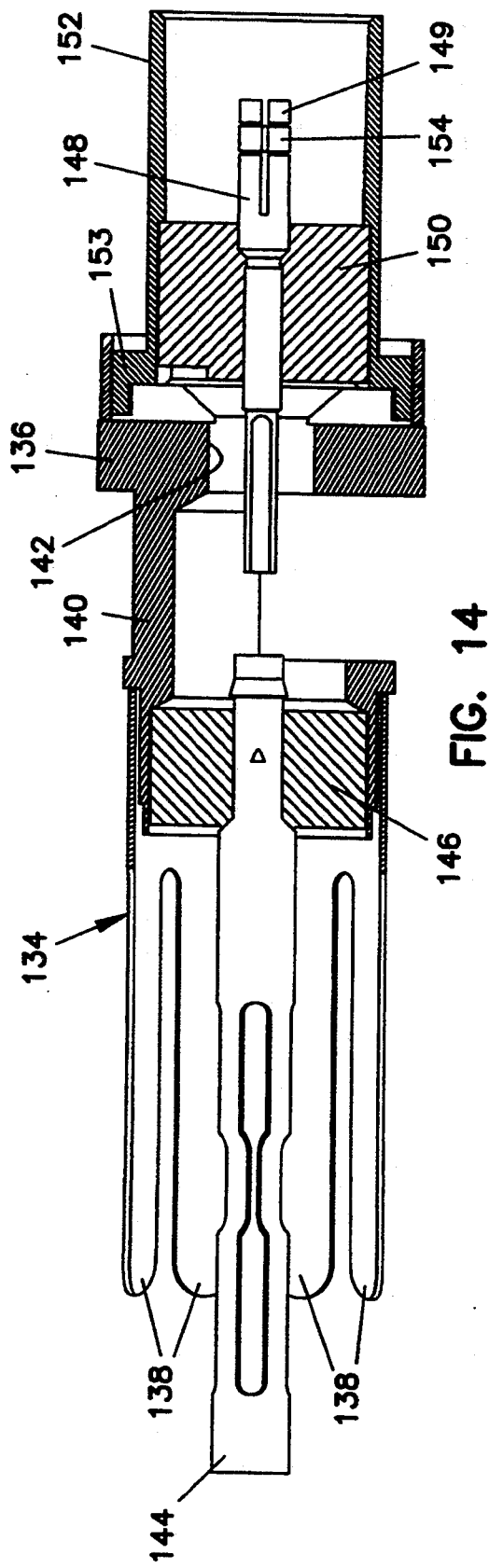
FIG. 14 is a longitudinal cross-sectional view of the assembly of FIG. 13.

The second jack subassembly 14 includes a jack unit 130 in combination with a barrel 132. The jack unit 130 is shown in FIGS. 13, 14 and the barrel unit is shown separately in FIG. 16.

The jack unit 130 includes a grounding portion 134 having a cup end 136 and a plurality of finger springs 138 disposed in a generally cylindrical array and connected to the cup portion 136 by a semicylindrical extension 140. The cup portion 136 has a bore 142 extending axially therethrough and coaxially aligned with the axis of the cylinder defined by the finger springs 138.

A forward center conductor 144 secured to a dielectric insulating spacer 146 is disposed within the cylinder defined by the finger springs 138. The center conductor 144 maintained generally coaxially aligned with the cylinder defined by the finger springs 138.

Figure 15:
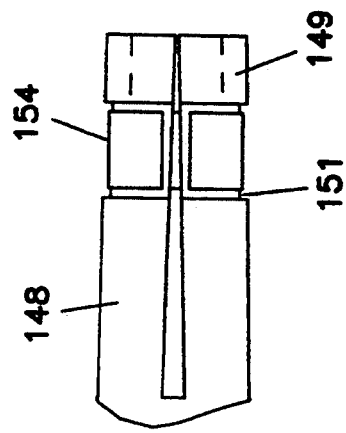
FIG. 15 is a top plan view of a crimped centering pin.

A rear center conductor 148 extends coaxially through bore 142 and is spaced from the walls of bore 142 by means of a dielectric insulating spacer 150 through which rear center conductor 148 passes. Spacer 150 is retained within a BNC connector 152. The connector 152 has a flange 153 that is received within the cup 136 and is retained on the cup 136 by coining the edges of the cup 136 over flange 153. Best shown in FIG. 15, a retaining ring 154 is received over a pin receiving end of rear conductor 148 with the retaining ring 154 crimped into a groove 151 formed in end 149. This manner of attaching the retaining ring 154 is identical to the manner of attaching the retaining rings 98,100 to ends 95,97 of the rear center conductors 94,96 shown in FIG. 7.

Figure 16:
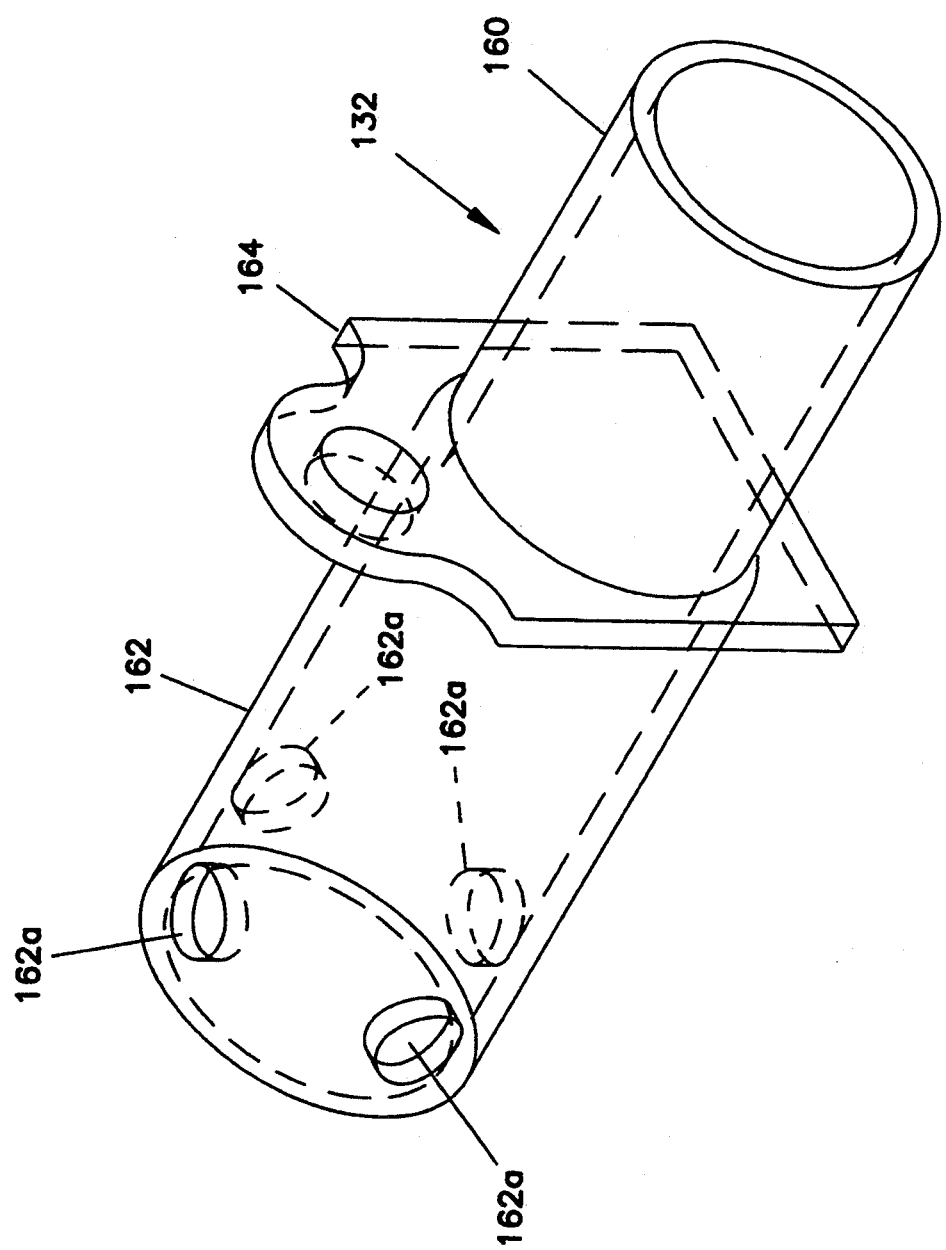
FIG. 16 is a perspective view of a barrel end for the second jack assembly of FIG. 13.

The barrel 132 shown in FIG. 16 includes a port end 160 and a cover 162 both of which are cylindrical and hollow and coaxially aligned separated by mounting tab 164. Cover 162 is sized to be received over finger springs 138 with the finger springs 138 urged against the interior walls of cover 162 to provide electrical grounding of grounding portion 134 to cover 162. A plug (not shown) inserted within port 160 has its external surfaces acting against the internal surfaces of finger springs 138 to electrically ground the casing of the plug to the fingers 138. The center pin of the plug (not shown) is received within conductor 144 and electrically connected thereto.

Shell half 18 is shown in detail in FIGS. 17-21. Similarly, shell half 16 is shown in detail in FIGS. 22-25. Each of the shall halves is similar. Each of halves 16,18 have holes 23 to receive nut and bolt fasteners 22 when the halves 16,18 are joined.

Shell half 18 includes a front wall 180 having three semicircular cutouts 181. Similarly, half 16 has a front wall 182 with three semicircular cutouts 183. The cutouts 181,183 are positioned and sized to surround ports 160,50,52 on sides thereof opposite the mounting tabs 164 and 163.

On interior surfaces of each halves 18,16, a first groove 190 is provided and sized to a receive flange 47 (FIG. 5) of front casting 44 to retain the front casting 44 in proper alignment between the halves 18,16. A second groove 192 is provided in each of halves 16,18 and sized and positioned to receive flange 106 (FIG. 11) of rear casting 88. Finally, a third groove 194 is provided within each of halves 16,18 and sized and positioned to receive flange 108 (FIG. 11) of rear casting 88. Accordingly, with the flanges 47,106,108 received within grooves 190,192 and 194 and with halves 16,18 joined together, the first jack assembly is securely received between the shell halves 16,18.

Each of the halves 16,18 include rear walls 200,202 having cutouts 201,203 to be received within a recess 205 (FIG. 11) of the rear casting 88. Further cutouts 201',203' are provided to receive cup end 136 (FIG. 13). Each of the cutouts 201',203' are provided with flats 201a',203a' corresponding the flats 136a on cup end 136. With the flats 201a',203a' opposing flats 136a, cup end 136 cannot rotate when the halves 16,18 are joined together.

The barrel 132 (FIG. 16) is provided with the plurality of holes 162a extending therethrough at 90° intervals along the outer circumference of the barrel 132. Interior surfaces of halves 16,18 are provided with raised protrusions 162b sized to be received within holes 162a. Accordingly, the barrel 132 is fixed in a relative rotational position when the halves 16,18 are joined. However, during assembly, the position can be selected from any one of a plurality of relative angular positions to change the angular orientation of tab 164.

The back walls 200,202 of halves 16,18 are provided with the cutouts 300 between recesses 201,203. As a result, after full assembly of the halves 16,18 around the first jack subassembly 12, gaps 302 (FIG. 2) are provided between opposing surfaces of the subassembly 12 and the halves 16,18. Through these gaps 302, conductors (such as coaxial cables, twisted pair cables or fiber optic conductors) can be passed to internal components as will become more fully apparent.

The halves 16,18 are provided with spaces 304 disposed between the areas for receiving the first and second subassemblies 12,14. When the halves 16,18 are joined, the spaces 304,305 define a cavity in which a plurality of electronic equipment can be received.

In a preferred embodiment for monitoring of signals, a printed circuit board 20 is provided within the spaces 304,305. The shell half 18 has raised platforms 420,422 on opposite sides of space 304. Alignment pins 424 project from platforms 420,422. The printed circuit board is received on the pins 424 and is secured to the platform by means of screws 425 (FIG. 4) received within holes 426 formed in the platform.

As shown in FIG. 4, in a preferred embodiment, conductor 54 is joined to conductor 96 by means of a wire 55 such that the wire 55, conductor 54 and conductor 96 form the completed first conductor 26 of the schematic of FIG. 4A. Forward conductor 56 of the OUT conductor 28 is connected to the printed circuit board 20 by means of a wire 57. Similarly, the rear portion of the conductor 28 is connected to the printed circuit board 20 by means of a wire 59. In a similar manner, the forward conductor 144 of the monitor conductor 30 is connected to the printed circuit board 20 by means of the wire as is the rear conductor 148 of the monitor 30 connected to the printed circuit board 20 by means of a wire 402. With this arrangement, a plurality of circuitries can be provided on the printed circuit board 20 to ensure a variety of different monitoring techniques. For example, the monitor can have resistance monitoring or inductive monitoring (both of which are well known to those skilled in the art) to monitor signals along conductor 28. Also, as will be appreciated from reference to FIG. 4, monitoring can be achieved by inserting a plug into port 160 or, alternatively, connecting a coaxial cable to connector 152.

While the invention has been shown in a preferred manner using a printed circuit board having an inductive monitoring network, it will be appreciated by those skilled in the art that a wide variety of functions can be added within area 304. For example, copper to optical fiber conversion can be placed within this area or a balun can be placed within this area to permit connection to twisted pair wires. The internal elements within this cavity can be connected to equipment external of the module 10 by means of passing twisted pair cables, coaxial cables or optical fibers through the openings 302 formed in the rear walls of shell halves 16,18.

With the structure thus described, we have achieved development of an inductive monitoring jack module 10 with a very low insertion loss of 1.15 dB up to 700 megahertz. The jack module 10 is transparent to the network.

From the foregoing detailed description of the present invention has been shown how the objects of the invention have been attained in a preferred manner. However, modifications and its equivalents of the disclosed concepts, such as those which readily occur to one skilled in the art are intended to be included within the scope of the claims.

What is claimed is:

1. A jack module comprising:
   (a) a first jack subassembly including:
      i. a first and a second coax center conductor each extending from a first end to a second end;
      ii. first support means for supporting said first and second coax center conductors in spaced apart alignment and including a first electrically grounded support casing at least partially surrounding each of said first and second coax conductors with insulation supports maintaining said first and second coax conductors within said first support casing; said first support casing including first and second ports associated with first ends of said first and second conductors, respectively, and first and second connectors associated with second ends of said first and second, respectively, conductors;
      iii. a jack switch having first spring means biased against each of said first and second coax center conductors to electrically connect said first and second center conductors and means for breaking electrical connection between said first and second center conductors upon insertion of a plug into either of said first and second ports;
   (b) a second jack subassembly including:
      i. a third coax center conductor extending from a first end to a second end;
      ii. second support means including a second electrically grounded support casing at least partially surrounding said third coax center conductor and insulation support for supporting said third coax center conductor within said second support casing;
   (c) a common housing surrounding said first and second jack subassemblies and having means for interlocking with said first and second support casings to retain said first and second jack subassemblies in spaced-apart alignment with said jack assemblies spaced-apart by a predetermined dimension and with said housing hollow within said dimension to define a cavity therein.

2. A jack module according to claim 1 comprising a circuit means disposed within said cavity.

3. A jack module according to claim 2 wherein said circuit means includes means for monitoring a signal along either one of said first and second coax center conductor by accessing a signal on either one of said first and second coax center conductors.

4. A jack module according to claim 3 wherein said circuit means is an inductive monitoring circuit.

5. A jack module according to claim 2 wherein said circuit means includes a printed circuit board disposed within said cavity and secured to said housing.

6. A jack module according to claim 1 wherein said housing includes a rear wall spaced from said first support casing with opposing surfaces of said rear wall and first support casing defining an access opening in communication with an interior of said housing.

7. A jack module according to claim 1 wherein said first jack subassembly includes a front portion and a rear portion each having:
   (a) a front support casing and a rear support casing cooperating to define said first support casing;
   (b) a first and a second front coax conductor and a first and a second rear coax conductor cooperating to define said first and second, respectively, coax center conductors;
   said first and second front coax conductors supported within said front support casing;
   said first and second rear coax conductors supported within said rear support casing;
   said first and second ports secured to said front support casing;
   said first and second connectors secured to said rear support casing; and
   each of said front and rear support casings including means for interlocking with interior surfaces of said housing to retain said front and rear support casings in desired alignment within said housing.

* * * * *